Figures 1, 2:
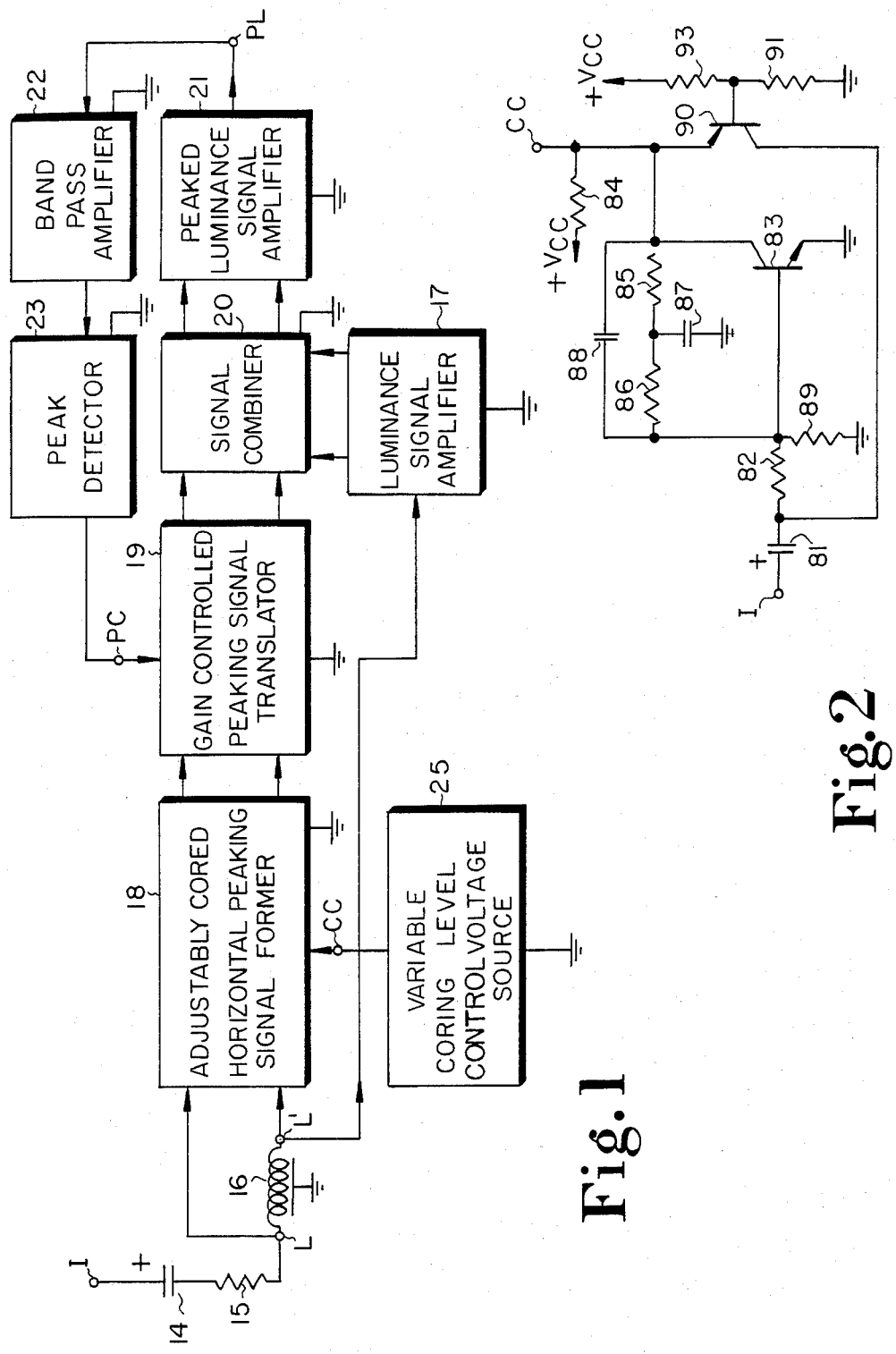

United States Patent [19]

Lagoni et al.

[11] Patent Number: 4,509,080
[45] Date of Patent: Apr. 2, 1985

[54] VIDEO SIGNAL PEAKING SYSTEM
[75] Inventors: William A. Lagoni; Wayne E. Harlan, both of Indianapolis, Ind.
[73] Assignee: RCA Corporation, New York, N.Y.
[21] Appl. No.: 394,885
[22] Filed: Jul. 2, 1982
[51] Int. Cl.³ .............................................. H04N 5/14
[52] U.S. Cl. .................................... 358/166; 358/167; 358/37
[58] Field of Search .......................... 358/166, 167, 37
[56] References Cited

U.S. PATENT DOCUMENTS

| 4,142,211 | 2/1979 | Faroudja | 358/167 |
|---|---|---|---|
| 4,167,749 | 9/1979 | Burrus | 358/8 |
| 4,316,210 | 2/1982 | Wharton | 358/166 |
| 4,399,460 | 8/1983 | Harwood et al. | 358/166 |
| 4,437,123 | 3/1983 | Harlan | 358/166 |
| 4,437,124 | 3/1983 | Cochran | 358/166 |

OTHER PUBLICATIONS

Article by R. H. McMann, et al. entitled "Improved Signal Processing Techniques for Color Television Broadcasting" appearing on pp. 221-228, of the Mar. 1968, issue of the SMPTE Journal.

Primary Examiner—John C. Martin
Assistant Examiner—Michael D. Parker
Attorney, Agent, or Firm—Eugene M. Whitacre; Paul J. Rasmussen; William H. Meagher

[57]  ABSTRACT

In the luminance channel of a color TV receiver, a horizontal peaking signal representative of the difference between delayed and undelayed luminance signals is subject to coring, with the level of coring subject to variation. Residual peaking signal remaining after core cancellation, is subject to gain controlled signal translation, and then combined with luminance signal to form peaked luminance signal. Frequency selective amplifier, responsive to peaked luminance signal, supplies its output to peak detector. Control voltage developed by peak detector adjusts gain of peaking signal translator in sense opposing amplitude variations of detector input, providing compensatory gain variations when coring level changes affect residual peaking signal amplitude.

3 Claims, 2 Drawing Figures

VIDEO SIGNAL PEAKING SYSTEM

The present invention relates generally to video signal peaking systems for enhancing horizontal detail rendition in an image reproduction, and particularly to peaking systems, suitable for use in a television receiver, in which a peaking signal, formed for addition to the video signals to introduce the desired detail enhancement, may be cored, with the level of coring subject to variation substantially without disturbance of the desired peaking effect.

Coring of a signal (i.e., removing a close-to-average-axis "core" of the signal, by processing the signal with a translator exhibiting a transfer characteristic with a dead zone for close-to-axis signal excursions) is a known signal processing function, occasionally resorted to for noise reduction purposes, as explained, for example, in an article by J. P. Rossi, entitled "Digital Techniques for Reducing Television Noise", appearing on pages 134–140 of the March, 1978 issue of the SMPTE Journal. In certain uses of a coring circuit, a facility for adjusting the level of coring to be effected may be desired. The facility may permit manual adjustment of the coring level (as shown, for example, in an article by R. H. McMann, et al. entitled "Improved Signal Processing Techniques for Color Television Broadcasting", appearing on pages 221–228 of the March 1968 issue of the SMPTE Journal), or may provide for a dynamic adjustment of coring level (as shown, for example, in U.S. Pat. No. 4,167,749—Burrus, where a coring level is varied as a function of the level of noise detected as accompanying a video signal).

In a television receiver, wherein a horizontal peaking signal component may be formed for addition to received luminance signals for detail enhancement purposes, the coring of such a peaking signal component is desirable so as to lessen the likelihood that undesired enhancement of background noise will accompany the desired picture detail enhancement.

In a copending U.S. patent application of L. Cochran, Ser. No. 373,750 (now U.S. Pat. No. 4,437,124), entitled "Dynamic Coring Circuit", an approach to control of the coring of a horizontal peaking component is suggested, wherein variation of the depth of coring effected is regulated in accordance with variations of the level of the low frequency content of the luminance signals to be peaked between black and white limits. The sense of the dynamic control proposed by Cochran is such that maximum coring is effected at the black extreme and minimum coring at the white extreme, in reliance on the observed phenomenon that low levels of background noise are more noticeable to a viewer when present in a dark portion of a viewed scene than when present in a bright portion thereof. Use of the Cochran system in controlling the depth of coring of a peaking signal component thus maximizes the protection against noise enhancement in those regions of a viewed scene where noise enhancement would be most objectionable and lessens the protection in those regions more tolerant of a higher noise level.

An undesirable consequence of variation of the level of coring of a horizontal peaking signal is that the magnitude of the cored signal, i.e., the residual signal remaining after core removal, also varies. Thus, for example, an increase in coring level may undesirably lessen the peaking effect attained by addition of the reduced magnitude peaking component to the luminance signals.

In an illustrative system for variable coring of a horizontal peaking signal, the range of coring levels may desirably extend between 0 and 6% of the maximum peak-to-peak swing of the peaking signal. While adjustment of the coring between the minimum and maximum levels introduces only a small percentage change in the residual amplitude of a peaking signal component of the maximum magnitude, such adjustment will necessarily introduce a much greater percentage change in the residual amplitudes of other peaking signal components of low or intermediate magnitude. Since such other peaking signal components contribute significantly to the overall picture sharpening effect provided by the peaking system, the indicated magnitude of coring level adjustment is capable of noticeably disturbing the peaking effect attained with the residual signals.

The present invention is directed to a horizontal peaking system employing coring of a horizontal peaking signal component, wherein the level of coring may be varied substantially without disturbance of the attainment of a desired peaking effect. Pursuant to the principles of the present invention, an adjustably cored peaking signal former is disposed to supply an input to an automatic peaking control system that automatically responds to residual signal magnitude variations accompanying coring level changes in a manner substantially precluding disturbance of the desired peaking effect attainment.

In accordance with an illustrative embodiment of the present invention, a horizontal peaking signal formed in response to video signals representative of the luminance of an image is subject to coring of an adjustable level prior to application to a gain controlled peaking signal translator. The output of the translator is combined with the luminance signals to form a peaked luminance signal. A peak detector, responsive to components of the peaked luminance signal falling withing a selected frequency range, develops a control voltage for control of the gain of the peaking signal translator. The sense of the gain control is such as to oppose variations in the amplitude of the components delivered to the peak detector. In the presence of coring level variations, resultant magnitude variations of the residual signals delivered to the input of the peaking signal translator are substantially removed by compensating variations of the translator gain.

In the accompanying drawings:

FIG. 1 illustrates, partially schematically and partially by block representation, a portion of a luminance channel of a color television receiver incorporating a peaking system in accordance with an illustrative embodiment of the present invention; and FIG. 2 illustrates schematically circuitry which may be illustratively employed for coring level control voltage development in the peaking system of FIG. 1.

In FIG. 1, a portion of the luminance channel of a color television receiver is shown. Video signals representative of the luminance of an image to be reproduced, illustratively derived from received composite color video signals by suitable comb filter apparatus (as shown, for example, in U.S. Pat. No. 4,096,516—Pritchard), appear at an input terminal I.

Luminance signals at terminal I are coupled via the series combination of a blocking capacitor 14 and a resistor 15 to the input terminal of a delay line 16. Illustratively, the resistance value of resistor 15 is chosen so as to terminate the input end of delay line with an impedance substantially matching the characteristic impedance of delay line 16. A luminance signal amplifier 17 responds to delayed luminance signals appearing at the output terminal (L') of delay line 16.

For horizontal peaking signal formation purposes, the output end of delay line 16 is desirably misterminated to obtain a reflective effect. The signals appearing at the respective ends of the delay line 16 are thus:

(a) a once-delayed luminance signal at terminal L', and
(b) the sum of an undelayed luminance signal and a twice-delayed luminance signal at terminal L. Illustratively, delay line 16 is a wideband device exhibiting a linear phase characteristic over the frequency band occupied by the luminance signals (e.g., extending to 4.0 MHz.) and provides a signal delay of 140 nanoseconds.

The difference between the respective signals at terminal L and L' corresponds to an appropriate horizontal peaking signal for addition to the luminance signal to enhance its horizontal detail by effectively boosting high frequency luminance components, with the maximum boost occurring at approximately 3.5 MHz. An adjustably cored version of such a peaking signal is formed by an adjustably cored horizontal peaking signal former 18, responsive to inputs from terminals L and L'. The depth of coring of the peaking signal developed by signal former 18 varies in accordance with a coring level control voltage applied to signal former 18 from an output terminal CC of a variable coring level control voltage source 25.

The adjustably cored horizontal peaking signal output of signal former 18 is supplied, illustratively in push-pull fashion, to a gain controlled horizontal peaking signal translator 19. The magnitude of the horizontal peaking signal output of translator is subject to variation in accordance with a gain control input to terminal PC of translator 19 which will be subsequently described.

A peaked luminance signal is formed by a signal combiner 20 responsive to push-pull outputs of the luminance signal amplifier 17, and push-pull outputs of the horizontal peaking signal translator 19. A peaked luminance signal amplifier 21 responds to push-pull versions of the peaked luminance signals developed by signal combiner 20 and develops a single-ended output for delivery to a peaked luminance signal output terminal PL.

The peaked luminance signal appearing at terminal PL is applied to the input of a bandpass amplifier 22 for automatic peaking control purposes. Illustratively exhibiting a passband of approximately 1 MHz, bandwidth centered about a frequency of approximately 2 MHz., amplifier 22 delivers the components of the peaked luminance signal falling within its passband to a peak detector 23, which develops a control voltage proportional to the peak amplitude of the delivered components. This control voltage is applied to a gain control input terminal PC of translator 19 to control the magnitude of the horizonal peaking signals supplied to combiner 20 in a sense opposing changes in the amplitude of said delivered components. Reference may be made to a copending U.S. patent application, Ser. No. 310,139 (now U.S. Pat. No. 4,399,460), filed Oct. 9, 1981, for a more detailed explanation of the operation of such an automatic peaking control system, and examples of advantageous circuitry for implementing the functions of the elements 17, 19, 20, 21, 22, and 23 (as well as for associating a manual peaking control therewith).

In instances where only manual control of the level of coring of the peaking signal input to translator 19 is desired, the variable coring level control voltage source 25 may simply comprise a potentiometer with a suitable DC potential supply connected across its fixed end terminals, and with control terminal CC connected to the potentiometer's adjustable tap. As tap adjustment varies the magnitude of the DC voltage applied to control terminal CC, the magnitude of the signal "core" removed in signal former 18 is altered. While a change in the magnitude of the residual signals delivered to the input of translator 19 will result, peak detector 23, responding to the peaked signal components delivered thereto, appropriately alters the gain control voltage supplied to terminal PC to introduce a compensating gain variation for translator 19 so as to preclude any significant disturbance of the peaking effect attained.

Where dynamic control of the level of coring of the peaking signal is desired in the manner proposed in the aforementioned Cochran application, the variable coring level control voltage source 25 may desirably take a form as described in the copending U.S. patent application, Ser. No. 373,531 (now U.S. Pat. No. 4,437,123), of W. Harlan, and as illustrated schematically in FIG. 2 of the drawings herein, now to be described.

In FIG. 2, the signals which appear at terminal I (the luminance signal input terminal of the FIG. 1 system) comprise luminance signals which appear with such a polarity that the (blacker-than-black) deflection synchronizing pulse components thereof extend in a negative direction. Signals from terminal I are applied via the series combination of a blocking capacitor 81 and a resistor 82 to an NPN transistor 83 for amplification thereby, with capacitor 81 and resistor 82 coupled, in the order named, between terminal I and the base electrode of transistor 83. The emitter electrode of transistor 83 is returned directly to ground, while the collector electrode of transistor 83 is connected via a load resistor 84 to an operating potential supply terminal $+V_{cc}$. A resistor 89 directly shunts the base-emitter path of transistor 83.

Feedback between the collector and base electrodes of transistor 83 is provided via a bridged-T filter network formed by a pair of resistors 85 and 86 connected in series between said collector and base electrodes, a capacitor 88 connected in shunt with the series combination of resistors 85, 86, and a capacitor 87 connected between ground and the junction of the serially disposed resistors 85, 86.

A PNP transistor 90, performing a feedback clamping action, has its emitter electrode directly connected to the collector electrode of amplifying transistor 83, and its collector electrode directly connected to the junction of capacitor 81 and resistor 82. The series combination of a pair of resistors 91, 93 is connected between ground and the $+V_{cc}$ terminal to form a voltage divider, which develops a reference DC potential at the junction of resistors 91, 93 for direct application to the base electrode of the clamping transistor 90.

The described circuitry forms an inverting signal translator for the input luminance signals which exhibits a low pass frequency response characteristic and provides a signal delay appropriate for substantial matching with the delay imparted by delay line 12. For an illustrative set of circuit parameters, the high frequency roll-off of the frequency response characteristic is desirably gradual with the cutoff frequency ($-3$ db. point on the characteristic) falling at approximately 1.05 MHz.

In operation of the disclosed circuitry for source 80, capacitor 81 isolates the signal translator from any variations of DC level that may occur at terminal I, as a consequence, for example, of input signal swing adjustments. A DC restoring action is performed by clamping transistor 90, which is normally periodically driven into conduction during sync pulse appearances. The charge on capacitor 81 is subject to a readjustment during these conduction periods that tends to clamp sync pulse peaks of the translator output at a potential determined by the reference potential developed by the voltage divider 93, 91 (and slightly offset therefrom). The reference potential is selected so that the translator output potential (at terminal CC) developed in response to a black level input introduces a desired coring depth (e.g., 6%). The gain of the signal translator, as determined by the ratio of the resistance value of resistor 82 and the sum of the resistance values of resistors 85 and 86, is selected so that the black-to-white signal swing for the translator output potential at terminal CC provides the desired gamut of coring depth variations. Illustratively, the gain selection is such that a zero coring level is reached for white levels beyond 70 to 80 IRE units.

A "soft" clamping action is provided in the described circuit, with clamping transistor 90 subject to keying by the signal itself (i.e., there being no external keying provided). For certain scene transitions, conduction by transistor 90 may be precluded for several line periods. These transient conditions have been found, however, to be tolerable, wherefore the added complexity and expense of external keying may conveniently be avoided.

In use of the FIG. 2 circuitry, as the low frequency content of the luminance signals at terminal I varies, the level of coring effected in the peaking signal former 18 of FIG. 1 system is automatically adjusted by the control potential variations developed at terminal CC. While such coring level adjustments result in undesired amplitude variations of the residual signals delivered to the input of the signal translator 19 of the FIG. 1 system, adverse effects of such amplitude variations are substantially precluded by compensating variations of the gain of signal translator 19 effected by the control potential output of peak detector 23.

The aforementioned copending Harlan application also illustrates schematically the details of circuitry which may be advantageously employed to implement the function of the adjustably cored horizontal peaking signal former 18 of the FIG. 1 system. In such an implementation, incorporated herein by reference, the peaking signal former 18 includes a linear signal translating channel and a non-linear signal translating channel, both responsive to the difference between the signals at the respective ends of the delay line 16, with the linear signal translating channel forming the horizontal peaking signal therefrom, and the non-linear signal translating channel providing a doubly clipped version of the peaking signal. Coring of the peaking signal is achieved by suitably combining the outputs of the channels to effect a cancellation of a core portion of the horizontal peaking signal. The non-linear signal translating channel takes the form of a multistage limiting amplifier, with the distribution of gain between cascaded stages of the limiting amplifier subject to variation in accordance with changes of the coring control potential. The cascaded amplifying stages of the limiting amplifier comprise respective differential amplifiers, each deriving its operating current from the collector electrode of a respective current source transistor. The base-emitter paths of the respective current source transistors are connected in series across a common source of bias. Variation of a variable DC impedance connected in shunt with the base-emitter path of one of the current source transistors effects the desired coring level control, with the variable DC impedance comprising the collector-emitter path of a control transistor having an adjustably biased base-emitter junction. To bring the minimum coring level to a zero value, a further control transistor, opposite in conductivity type to the first control transistor, is shunted across the common bias source, with its base rendered responsive to the same coring level control input as is delivered to the base of the first control transistor.

What is claimed is:

1. In an image reproduction system, including a source of video signals representative of the luminance of an image to be reproduced, a video signal peaking system comprising:
   means, responsive to said video signals for forming an adjustably cored horizontal peaking signal output, said forming means having a coring level control terminal, with the depth of coring of said horizontal peaking signal output effected by said forming means being dependent upon the level of a potential appearing at said control terminal;
   means for developing a variable coring level control potential, said variable coring level control potential being supplied to said control terminal;
   a gain controlled peaking signal translator responsive to said adjustably cored horizontal peaking signal output of said forming means;
   means for combining the output of said gain controlled peaking signal translator with video signals derived from said source to form a peaked luminance signal;
   a frequency selective amplifier having an input responsive to said peaked luminance signal and exhibiting a passband encompassing a portion of the frequency band occupied by said video signals; and
   means, responsive to the amplitude of an output of said frequency selective amplifier for controlling the gain of said peaking signal translator in a sense opposing variations of said amplitude.

2. Apparatus in accordance with claim 1 including a delay line having a properly terminated input end to which video signals from said source are applied, and having a misterminated output end, wherein said forming means is responsive to signals appearing at said input and output ends of said delay line.

3. Apparatus in accordance with claim 1 wherein said control potential developing means is rendered responsive to video signals from said source.

* * * * *